July 7, 1959
J. A. FORD ET AL
2,893,246
GYROSCOPIC APPARATUS
Filed Oct. 23, 1953
2 Sheets-Sheet 1
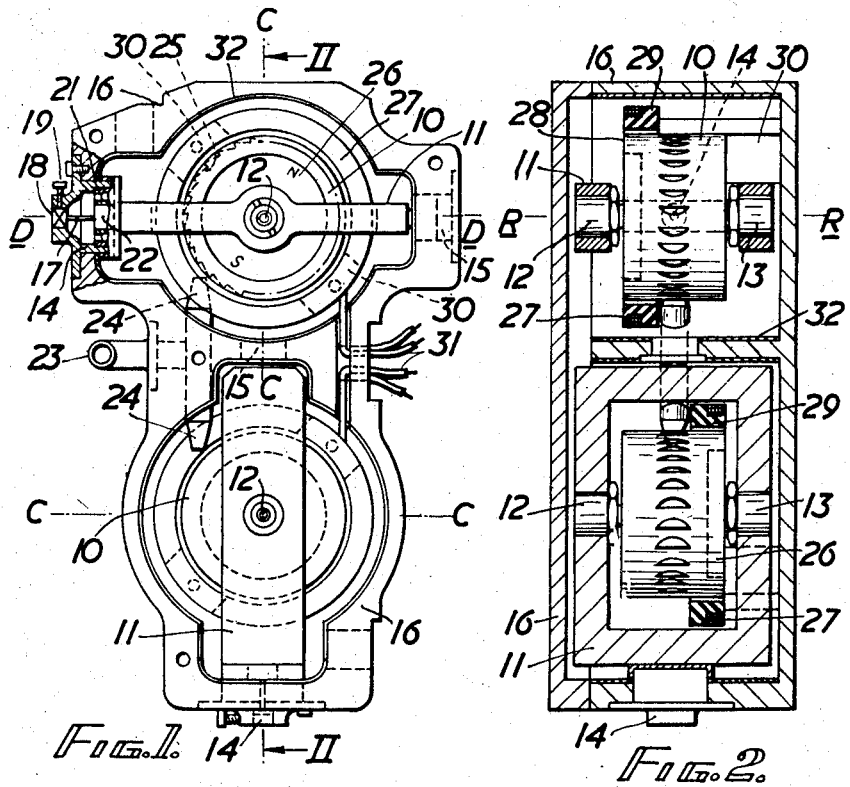
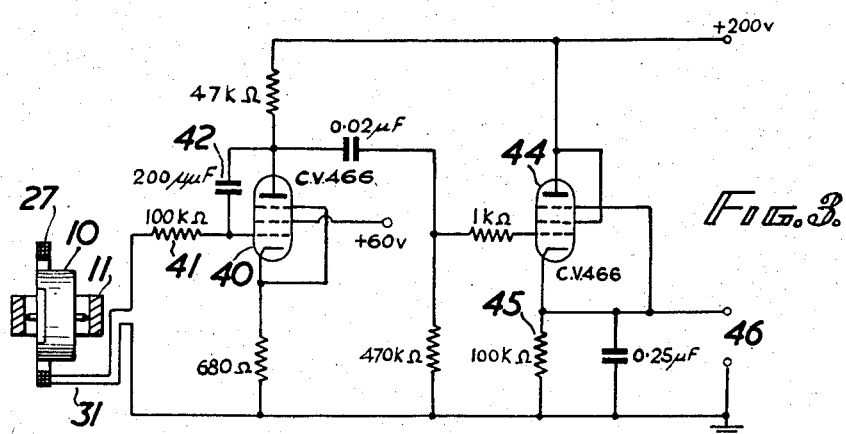
INVENTORS
John A. Ford.
Michael. C. Jackson.
Ronald C. Crook
BY Watson, Cole, Grindle & Watson
ATTORNEYS

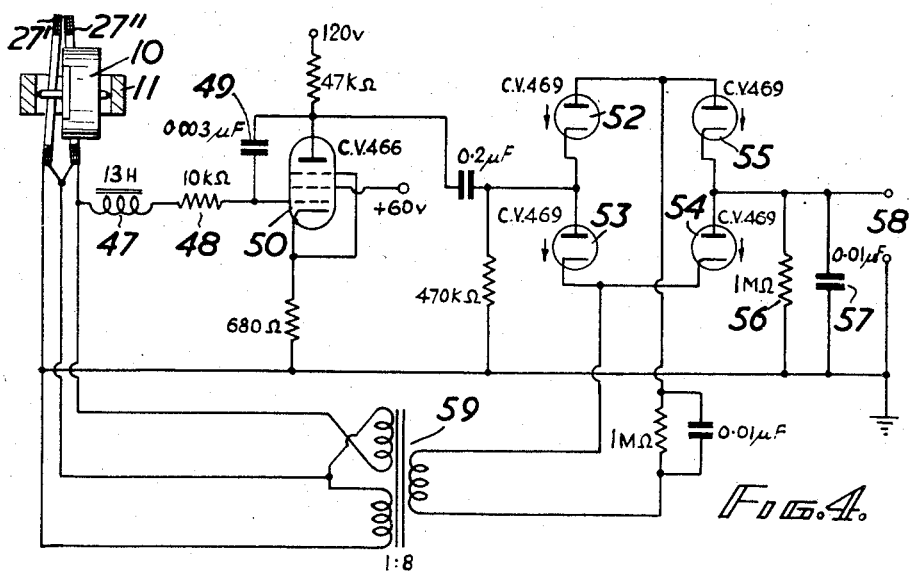
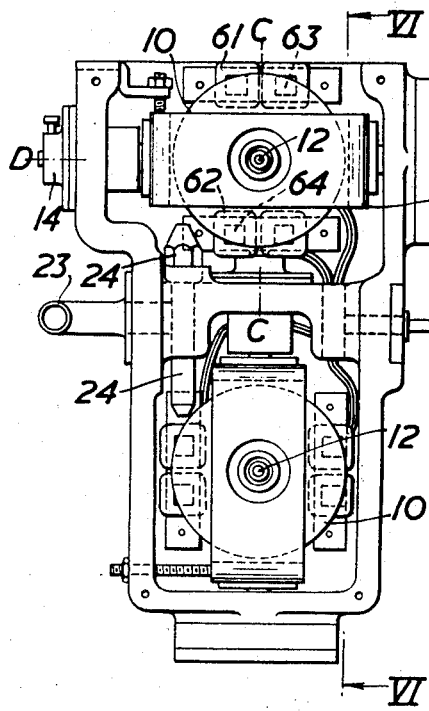
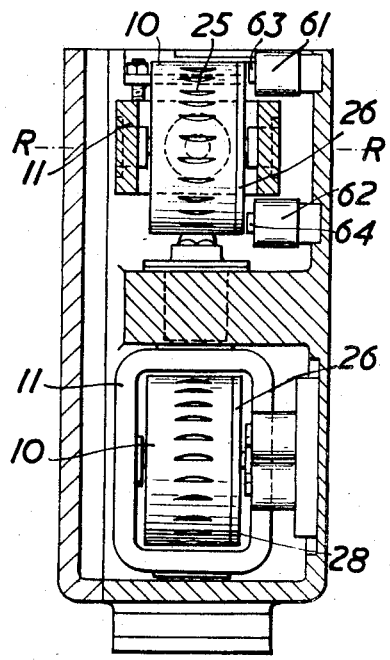

United States Patent Office 2,893,246
Patented July 7, 1959

2,893,246

GYROSCOPIC APPARATUS

John Arthur Ford, Michael Cullen Jackson, and Ronald Charles Crook, all of Middlesex, England, assignors to The Fairey Aviation Company Limited, Hayes, England, a company of Great Britain Application October 23, 1953, Serial No. 388,036

Claims priority, application Great Britain October 27, 1952

17 Claims. (Cl. 74—5.6)

The invention is concerned with gyroscopic apparatus of the constrained type that is, the type in which the gyroscope rotor is arranged to rotate in a frame about an axis of rotation, and the frame is arranged to deflect relatively to a support against the action of a spring about an axis of deflection at right angles to the axis of rotation. With such a gyroscope the angle of deflection of the frame is a measure of the rate of turn of the complete unit about an axis of control at right angles both to the axis of rotation and the axis of deflection.

The invention is concerned largely with an improved form of pick-off for giving an electrical signal corresponding to the angle of deflection about the axis of deflection to enable a remote indication to be given, or a controlling function to be exercised, in accordance with the rate of turn of the complete unit about the axis of control. Many forms of such pick-off have been proposed in the past.

According to the present invention gyroscopic apparatus of the type specified includes a voltage generator whereof the rotor is a part of the gyroscope rotor, and the stator is carried by the support, the arrangement being such that the voltage generated is a function of the angle of deflection of the frame relatively to the support about the axis of deflection.

The generator rotor may include a permanent magnet with its axis substantially perpendicular to the axis of rotation of the gyroscope.

Such an arrangement has the advantage that no special source of voltage is required for the pick-off, as has been necessary in prior types of pick-off.

The arrangement has the further advantage of giving a measure of the rotor speed, since the frequency of the signal will be proportional to this speed.

Now, the angle of deflection of the rotor-bearing frame of a constrained gyroscope against a linear elastic restraint varies not only with the rate of turn to be measured but also with the rotational speed of the rotor. In many applications this speed cannot be kept constant, for example in applications where the rotor is run up to speed and allowed to coast under its own momentum during operation, whilst in other cases the necessity to keep the rotor speed constant involves extra complication, weight, bulk or expense.

Because the voltage output of the pick-off for a given deflection also varies with rotor speed, the voltage for a given rate of turn about the axis of control will vary as the square of the rotor speed.

According to a further feature of the invention the voltage generated is integrated twice by supplying it as input to a doubly-integrating network.

In some applications it may be sufficient to perform but a single integration of the voltage so that the output voltage from the singly-integrating network for a given rate of turn will vary with the gyroscope rotor speed, and not with the square of the speed.

In one embodiment of the invention the stator includes a single coil surrounding the generator rotor with its axis parallel with the axis of rotation when the rotor-bearing frame is in the equilibrium position, that is to say the position in which the rate of turn about the axis of control is zero and the spring is unstrained.

The voltage generated in the coil as the rotor rotates will be proportional to the rotor speed and to the sine of the angle between the axis of the coil and the axis of rotation, being zero when this angle is zero. Since for small angles the sine of an angle is approximately equal to the angle, the voltage generated at a given speed will be proportional to the angle of deflection of the rotor-bearing frame, which, in turn will be proportional to the rate of turn of the complete unit about the axis of control perpendicular to both the axis of deflection and the axis of rotation.

Because the equilibrium position of the rotor-bearing frame is that in which the axis of the coil is parallel with the axis of rotation of the gyroscope, then, for equal angles of deflection of the rotor-bearing frame in opposite senses, the voltages generated in the coil will be equal but of opposite phase.

Although the angle of deflection can be readily measured, discrimination between deflections in one sense and deflections in the other sense may be difficult.

This difficulty may be overcome in an arrangement in which the coil is positioned so that its axis makes a small angle with the axis of rotation when the rotor-bearing frame is in the equilibirum position. There will thus be a datum voltage generated in the coil when the rotor-bearing frame is undeflected from the equilibrium position. Deflection of the rotor-bearing frame will cause the datum voltage to be increased or decreased in accordance with the sense of deflection by an amount proportional to the angle of deflection. Thus the magnitude of the voltage generated in the coil will show both the angle and the sense of deflection.

A similar effect is obtained in an alternative arrangement in which the stator includes a core which, with a part of the generator rotor and an air gap between the core and the generator rotor, forms a magnetic circuit, whereof the length of the air gap is linearly related to the angle of deflection of the frame about the axis of deflection; and a pick-off coil linking the magnetic circuit. The core may be displaced from the axis of rotation in a direction perpendicular to the axis of deflection.

The reluctance of the magnetic circuit will be substantially proportional to the total length of air gap and consequently it will be linearly related to the angle of deflection of the frame, if the angle is small. Thus the voltage generated will be a function of the rate of turn of the complete unit about the axis of control. The magnitude of the voltage generated will show both the degree and sense of the rate of turn.

These arrangements have the disadvantage, however, that if it is necessary to integrate the voltage either once or twice, the output from the integrating network will not be independent of speed because single or double integration of the constant term corresponding to the datum voltage will produce in the output of the integrating network a term proportional to the gyroscope rotor speed or the speed squared.

Thus according to another aspect of the invention, gyroscopic apparatus of the type specified includes a voltage generator whereof the rotor is a part of the gyroscope rotor and the stator is carried by the support, the arrangement being such that the generator generates two voltages each of which is a function of the angle of deflection of the frame relatively to the support about the axis of rotation, and that the two voltages are equal when the frame is in the equilibrium position and change in opposite senses when the frame deflects, The two voltages generated may be subtracted one from the other to produce a resultant voltage which will be proportional to the angle of deflection of the rotor-bearing frame and will be zero when it is in the equilibrium position. As the rotor-bearing frame deflects from the equilibrium position one of the voltages will increase and the other will decrease, and therefore the resultant voltage will be of one phase or the other according as the deflection is in one sense or the other. The two generated voltages may also be added to produce a resultant voltage which is substantially constant, because when one of the generated voltages increases the other decreases. This constant voltage may be used as a reference from which to determine the sense of deflection of the frame because the resultant (subtracted) voltage will be in phase, or in phase opposition with the constant reference voltage according as the deflection is in one sense or the other.

In one embodiment of this aspect of the invention the generator stator includes two coils surrounding the generator rotor with their axes making equal and opposite small angles with the axis of rotation when the rotor-bearing frame is in the equilibrium position.

In another embodiment of this aspect of the invention the generator stator includes two cores which are displaced from the axis of rotation in opposite directions perpendicular to the axis of deflection and each of which, with a part of the generator rotor and air gaps between the core and the rotor, forms a magnetic circuit; and a pick-off coil linking each magnetic circuit. As the generator rotor rotates, the lines of magnetic force from the magnet will link with the magnetic circuits and voltages will be generated in the pick-off coils which are proportional to the rotor speed and inversely proportional to the reluctance, and hence approximately to the total air gap length, of the appropriate magnetic circuit.

As the frame deflects, the total air gap length in the magnetic circuit is changed by a length proportional to the sine of the angle of deflection, the air gap in one of the magnetic circuits decreasing in length and the air gap in the other increasing in length. The voltage generated in each coil will therefore be proportional to the rotor speed and inversely proportional to the angle of deflection (if it is small) plus a constant term representing the length of the air gap when the frame is in the equilibrium position.

With either of the embodiments in which the generator generates two voltages which change in opposite senses as the frame deflects it is possible, by double integration, to obtain an output which is a function of the rate of turn and independent of rotor speed, and which discriminates between turns of opposite senses.

The invention may be carried into practice in various ways but certain specific embodiments will be described by way of example with reference to the accompanying drawings in which:

Figure 1 is a plan view of one form of gyroscopic device, with the cover removed, Figure 2 is a sectional side elevation of the device shown in Figure 1, Figure 3 is a circuit diagram of an integrating and rectifying circuit suitable for a single pick-off coil, Figure 4 is a circuit diagram of a circuit for a double pick-off coil, and Figures 5 and 6 are views similar respectively to Figures 1 and 2 of a modified form of gyroscopic device employing solenoids.

Figures 1 and 2 of the drawings show a gyroscopic device embodying two gyroscopes respectively for measuring the rate of turn about two axes at right angles. In principle the two gyroscopes and their associated apparatus are identical, and it is thought that it will be sufficient to describe only one of them.

In each case the gyroscope includes a gyroscope rotor 10 mounted to rotate about an axis of rotation R—R in bearings 12 and 13 in a rotor-bearing frame 11. The frame 11 is mounted to turn about an axis of deflection D—D in bearings 14 and 15 carried by a support constituted by a case 16. The case 16 is supported on the aircraft or other apparatus with which the gyroscope is to be used.

The gyroscope is of the constrained type in which angular deflection of the frame is made against an elastic restraint which varies with the angle of deflection from the equilibrium position (that is the position of the frame in which the restraining torque is zero). The restraint is provided by a torsion bar 17 positioned in the bearing 14. The torsion bar 17 has a square head 18 which is clamped by a grub screw 19 in a square socket formed in a part of the case 16 so that it cannot rotate about the axis D—D. A ball bearing 21 supports a short shaft 22 secured to the frame 11 so that in the absence of the torsion bar 17 the frame 11 could deflect freely about the axis of deflection D—D within the limits determined by contact of the frame against the case.

The shaft 22 is, however, secured to the end of the torsion bar 17 remote from the head 18 so that deflection of the frame 11 twists the torsion bar 17 which thus provides an elastic restraint which increases with the angle of deflection. The bearing 15 at the other end of the frame 11 is a free bearing and provides negligible restraint against deflection of the frame.

The rotor 10 is driven by air which is introduced into the case 16 through a pipe 23 and a nozzle 24, and for this purpose the rotor has around its circumference a number of notches 25 against which the air can act. The gyroscope as so far described is a conventional air driven constrained gyroscope.

As is well understood with constrained (or rate) gyroscopes the angle of deflection of the frame about the axis of deflection is proportional to the rotor speed and also proportional to the rate of turn of the case about an axis of control which is perpendicular to both the axis of rotation and the axis of deflection.

In accordance with the invention the angle of deflection of the frame 11 about the axis of deflection is measured by means of a small electric A.C. generator whereof the rotor is constituted by a permanent magnet 26 incorporated in the gyroscope rotor while the stator is constituted by a coil 27 carried by the case 16.

The magnet 26 is in the shape of a disc having its magnetic axis lying along a diameter. The disc is seated in the disc-shaped recess in the end face 28 of the rotor 10. Thus, as the rotor 10 rotates about the axis of rotation R—R the magnetic field produced by the magnet also rotates about the axis R—R. The magnet described has a single pair of poles but it could have more than one pair, adjacent poles being of opposite polarity and spaced apart at equal angles around the axis of rotation R—R.

The coil 27 which consists of many turns of wire is carried in a ring 29 of insulating material which is supported on legs 30 secured to the base of the case 16. The coil is arranged with its axis parallel with the axis of rotation R—R of the rotor 10 when the frame 11 is in the equilibrium position, that is, the position in which the torsion bar 17 is unstrained. Conductors 31 lead from the coil to the outside of the case 16.

Inside the case 16 and surrounding the coil 27 is a cylindrical shell 32 of ferro-magnetic material which completes the magnetic circuit defined as follows:

The north pole of the magnet 26, gap between north pole and coil 27, coil 27 gap between coil 27 and shell 32, shell 32, gap between shell 32 and coil 27 (opposite south pole of magnet 26), coil 27, gap between coil 27 and south pole of magnet 26, and south pole of magnet 26.

So long as the axis of rotation is in line with the axis of the coil the resultant flux linking the coil will be constant or zero as the magnet rotates. When, however, the rotor-bearing frame 11 deflects so that the axis of rotation is inclined to the axis of the coil then as the rotor rotates the resultant flux linking the coil will vary so that an alternating flux is produced and hence an alternating voltage is generated in the coil. The voltage generated in the coil will be proportional to the rotor speed and also proportional to the angle between the axis of the coil and the axis of rotation R—R. Its frequency will be the frequency of rotation of the rotor 10. This voltage can be measured by connecting a meter across the conductors 31.

If the rotor speed is constant, an A.C. voltmeter connected across the conductors 31 will give a reading which is proportional to the angle of deflection of the frame 11 about the axis of deflection D—D, and thus to the rate of turn of the case 16 about an axis of control C—C perpendicular to both the axes of rotation and deflection.

However, the voltage generated is proportional to the square of the speed of rotation as well as to the rate of turn about the control axis, because the angle of deflection of the frame is proportional to both the rate of turn about the control axis, and the speed of rotation, and the voltage generated is proportional to both the angle of deflection of the frame and the speed of rotation. Thus, if the speed of rotation is not constant, the voltage generated will not give an indication of the rate of turn directly.

The voltage proportional to the square of the rotor speed may be integrated twice to make it independent of rotor speed by supplying it as input to a doubly-integrating network. This may consist of two resistor-condenser stages in series, the outputs being taken from across the condensers. Preferably, however, one stage is similar to the integrating stage in the circuit shown in Figure 3. The integrating stage in this circuit includes an amplifier valve 40, the input to which is conected to the grid through a resistor 41. A condenser 42 is connected between the grid and the anode of the valve. The stage acts as an integrating amplifier consisting of the resistor 41 in series with the condenser 42, the voltage across which condenser is amplified by the valve 40. The output of the stage is connected to an infinite input impedance detector consisting of a valve 44 the output of which is taken from across its cathode resistor 45 at terminals 46. The input is shown as the voltage generated in coil 27. The output from the detector is a direct voltage proportional to the integral of the input signal obtained from the coil 27 and thus proportional to the rate of turn of the case 16 about the axis of control C—C and also to the rotor speed.

In some applications a single integration of the voltage generated will be sufficient, some sensitivity to rotor speed variations being allowable, but if it is desired to obtain a signal independent of rotor speed an additional integrating stage may be used through which the generated voltage is passed. This may, for example, be a resistor-condenser stage connected between the coil 27 and the resistor 41.

It will be observed that the voltages generated in the coil 27 for equal deflections of the frame 11 in opposite senses will be of the same magnitude but opposite phase and it may be difficult to distinguish between deflections in opposite senses.

In order to obtain a voltage which by its magnitude shows both the angle and the sense of the deflection of the frame 11, the coil 27 may be mounted in the case 16 with its axis at a small angle to the axis of rotation R—R. This angle should be a little greater than the greatest angle of deflection in one sense permitted to the frame 11. The voltage generated in the coil 27 will not be zero when the frame 11 is in the equilibrium position but will have a datum value. When the frame 11 deflects the voltage will increase above or decrease below the datum value according to the sense of the deflection. The magnitude of the voltage between the conductors 31 will thus show both the degree and the sense of the deflection of the frame 11.

The voltage generated will consist of a component proportional to the rotor speed (the datum voltage) and a component proportional to the rotor speed squared and to the rate of turn of the case about the axis of control.

This voltage may be integrated once by supplying it to a circuit similar to that described with reference to Figure 3 to provide a voltage consisting of a constant component and a component proportional to both the rotor speed and the rate of turn about the axis of control. This voltage cannot usefully be integrated twice because the constant component would produce a term inversely proportional to the rotor speed in addition to the term proportional to the rate of turn and independent of the rotor speed derived from the other component. However, in some applications the decrease in sensitivity with change in rotor speed is acceptable.

This difficulty may be overcome by means of another arrangement in which the coil 27 is replaced by two coils 27' and 27" supported in a ring similar to the ring 29 with their axes making equal and opposite small angles with the axis of rotation R—R. When the frame is in the equilibrium position the difference between the two voltages generated in the coils will be zero, but as the frame deflects one of the voltages will increase and the other will decrease so that the difference will increase from zero with a phase in accordance with the sense of the deflection. The voltages generated in the two coils may also be added to provide a reference voltage which is substantially constant because as one voltage increases the other decreases. The phase of the signal (difference) voltage may be compared with the reference voltage to determine the sense of the deflection.

Because the signal (difference) voltage is zero when the frame is undeflected from the equilibrium position, it may be integrated twice to provide a voltage independent of the rotor speed without the introduction of a term derived from a datum voltage.

A suitable circuit for doubly-integrating the signal voltage and comparing it with the constant (sum) voltage is shown in Figure 4.

The pick-off coils 27' and 27" are connected in series with a circuit including an inductor 47, a resistor 48 and a condenser 49 in series. The coils are connected in opposition so that the resultant voltage in the circuit 47, 48, 49 will be zero when the frame 11 is in the equilibrium position. The condenser 49 is connected between the anode and control grid of a valve 50. The anode of the valve 50 is connected to one corner of a bridge including four diode valves 52, 53, 54, and 55, one in each of its arms. The opposite corner of the bridge and the cathode of valve 50 are connected through a smoothing circuit consisting of a resistor 56 and a condenser 57 to output terminals 58.

The two coils 27' and 27" are also connected to two primary windings of a transformer 59 in such a way that the total input voltage to the transformer is equal to the sum of the voltages generated in the coils 27' and 27". Because one of these voltages increases and the other decreases as the frame 11 deflects, the input voltage and hence the output voltage of the transformer 59 is substantially independent of deflection of the frame 11. The secondary winding of the transformer 59 is connected through a resistor and condenser in parallel across the other two corners of the bridge. The anodes of the four diode valves are all coupled to the same side of the secondary winding of the transformer 59.

During a positive half cycle of the reference voltage current can pass through all the diode valves because the anodes are all positive with respect to the cathodes, but during a negative half cycle of the reference voltage current cannot pass through any of the diode valves because the anodes are negative with respect to the cathodes.

The operation of the circuit is as follows:
The difference between the voltages generated in the two coils 27' and 27" is doubly-integrated by the inductance-resistance-capacity circuit 47, 48, 49 as is well understood and is thus made independent of the rotor speed. The doubly-integrated voltage is amplified in the valve 50 and the amplified doubly-integrated voltage is supplied to the bridge.

This voltage will be in phase or in phase opposition with the reference voltage according as the deflection of the frame 11 is in one sense or the other. Thus current due to the doubly-integrated voltage will pass to the terminals 58 by way of diode valve 53, the secondary winding of transformer 59, and diode valve 55, or by way of diode valve 52, the secondary winding, and diode valve 54, according as the deflection is in one sense or the other. In passing through the bridge the current will be half-wave rectified. The polarity of the direct pulsating voltage appearing across the terminals 58 will depend on the direction of current flow through the bridge and hence on the sense of the deflection of the frame 11.

Thus the voltage at the output terminals 58 will show both the magnitude and the sense of the rate of turn of the case 16 about the axis of control C—C.

The damping factor of the inductance-resistance-capacity circuit 47, 48, 49 may be 0.6. This attenuates at 12 db per octave for all frequencies above twice the natural frequency of the circuit and attenuates the signals by 12 db at this frequency. The self-capacity of the inductor 47, is not negligible and affects the values chosen. The natural frequency of the circuit may be chosen as half the minimum rotor speed, giving good compensation for the range of speeds anticipated.

Figures 5 and 6 show a form of gyroscopic device that is similar to that of Figures 1 and 2 but differs in that the pick-off coils are replaced by solenoids presented to a face of the rotor. In other respects the devices are the same and bear the same reference numerals.

Thus the pick-off of Figures 5 and 6 includes two solenoid coils 61 and 62 each of which is wound around one limb of a U-shaped magnetic core 63 or 64. The cores 63 and 64 are placed with the ends of the U's adjacent the end face 28 of the rotor 10, so as to define with it four air gaps. There are thus two magnetic circuits, each consisting of a core, two air-gaps, and a part of the rotor including magnetic poles. The four ends of the U's lie in a plane which is perpendicular to the axis of rotation of the rotor 10 when the frame 11 is in the equilibrium position in which the torsion bar 17 is unstrained.

As the rotor 10 rotates the number of lines of magnetic force from the magnet 26 which enter the cores 63 and 64 will vary continually so that voltages will be generated in the coils 61 and 62 which are proportional to the rotor speed and inversely proportional to the length of the air gap in the appropriate magnetic circuit. The cores 63 and 64 are displaced from the axis of rotation R—R in a direction at right angles to the axis of deflection D—D and thus as the frame 11 deflects the total length of the air gap in one of the magnetic circuits will increase and that in the other will decrease by an amount proportional to the sine of the angle of deflection. The voltages generated in the coils 61 and 62 will therefore be inversely proportional to a term which is the sum of two components, one representing the angle of deflection and the other which is constant representing the length of the air gap when the frame 11 is in the equilibrium position.

The initial total air gap length in each magnetic circuit when the frame is in the equilibrium position should be large compared with the changes in air gap length due to deflection.

The two voltages may be doubly-integrated and rectified separately and the resultant voltages subtracted one from the other. This will produce an output voltage which is proportional to the rate of turn of the case about the axis of control and independent of rotor speed, being zero when the frame is in the equilibrium position.

What we claim as our invention and desire to secure by Letters Patent is:

1. Gyroscopic apparatus including a support, a frame mounted in the support for angular deflection about an axis of deflection, a gyroscope rotor mounted in the frame for rotation about an axis of rotation perpendicular to the axis of deflection, spring restraining means for providing a restoring torque varying with deflection of the frame from an equilibrium position but independent of rotor speed, an electric generator having a rotor including a rotating permanent magnet forming part of the gyroscope rotor with a magnetic axis substantially perpendicular to the axis of rotation, and a stator carried by the support and comprising at least one pick-off coil carried by the support and co-operating with the generator rotor to produce at least one voltage which is a function of the angular deflection of the frame at a frequency which is proportional to the rotor speed.

2. Gyroscopic apparatus as claimed in claim 1, in which the stator includes a coil surrounding the generator rotor with its axis parallel with the axis of rotation when the rotor-bearing frame is in the equilibrium position.

3. Gyroscopic apparatus as claimed in claim 1 in which the stator includes a coil surrounding the generator rotor with its axis making a small angle with the axis of rotation when the rotor-bearing frame is in the equilibrium position.

4. Gyroscopic apparatus as claimed in claim 1, in which the stator includes a core which is displaced from the axis of rotation in a direction perpendicular to the axis of deflection and which, with a part of the generator rotor and an air gap between the core and the generator rotor, forms a magnetic circuit, whereof the length of the air gap extends substantially parallel to the axis of rotation and is a function of the deflection of the frame about the axis of deflection; the pick-off coil linking the magnetic circuit.

5. Gyroscopic apparatus including a support, a frame mounted in the support for angular deflection about an axis of deflection, a gyroscope rotor mounted in the frame for rotation about an axis of rotation perpendicular to the axis of deflection, spring restraining means for providing a restoring torque varying with deflection of the frame from an equilibrium position but independent of rotor speed, an electric generator having a rotor including a rotating permanent magnet forming part of the gyroscope rotor with a magnetic axis substantially perpendicular to the axis of rotation, and a stator carried by the support and comprising two pick-off coils carried by the support and each co-operating with the generator rotor to produce a voltage which is a function of the angular deflection of the frame at a frequency which is proportional to the rotor speed, the said voltages being equal when the frame is in the equilibrium position and changing in opposite senses when the frame deflects.

6. Gyroscopic apparatus as claimed in claim 5, in which the stator includes two coils surrounding the generator rotor with their axes making equal and opposite small angles with the axis of rotation when the rotor-bearing frame is in the equilibrium position.

7. Gyroscopic apparatus as claimed in claim 5 in which the stator includes two cores which are displaced from the axis of rotation in opposite directions perpendicular to the axis of deflection and each of which, with a part of the generator rotor and air gaps between the core and the rotor, forms a magnetic circuit; the pick-off coils respectively linking the magnetic circuits.

8. Gyroscopic apparatus including a support, a frame mounted in the support for angular deflection about an axis of deflection, a gyroscope rotor mounted in the frame for rotation about an axis of rotation perpendicular to the axis of deflection, spring restraining means for providing a restoring torque varying with deflection of the frame from an equilibrium position but independent of rotor speed an electric generator having a rotor including a rotating permanent magnet forming part of the gyroscope rotor with a magnetic axis substantially perpendicular to the axis of rotation, and a stator carried by the support and comprising at least one pick-off coil carried by the support and co-operating with the generator rotor to produce at least one voltage which is a function of the angular deflection of the frame at a frequency which is proportional to the rotor speed, and an integrating network having its input electrically connected to the said stator and serving to integrate the output thereof at least once.

9. Gyroscopic apparatus as claimed in claim 8 including means for rectifying the integrated output from the stator.

10. Gyroscopic apparatus as claimed in claim 8 in which the network is a doubly-integrating network serving to integrate the stator output twice.

11. Gyroscopic apparatus as claimed in claim 10 including means for rectifying the integrated output from the stator.

12. Gyroscopic apparatus as claimed in claim 11 in which the rectifying means is arranged to produce an output whereof the polarity depends on the sense of the angular deflection of the frame.

13. Gyroscopic apparatus including a support, a frame mounted in the support for angular deflection about an axis of deflection, a gyroscope rotor mounted in the frame for rotation about an axis of rotation perpendicular to the axis of deflection, spring restraining means for providing a restoring torque varying with deflection of the frame from an equilibrium position but independent of rotor speed an electric generator having a rotor including a rotating permanent magnet forming part of the gyroscope rotor with a magnetic axis substantially perpendicular to the axis of rotation, and a stator carried by the support and comprising two pick-off coils carried by the support and each co-operating with the generator rotor to produce a voltage which is a function of the angular deflection of the frame at a frequency which is proportional to the rotor speed, the said voltages being equal when the frame is in the equilibrium position and changing in opposite senses when the frame deflects, an integrating network, means for subtracting the said voltages and applying the difference to the input of the integrating network, means for adding the said voltages and deriving therefrom a reference wave, and means for comparing the phase of the integrated difference with that of the reference wave to determine the sense of the deflection of the frame.

14. Gyroscopic apparatus as claimed in claim 13 in which the phase comparing means comprise four rectifiers bridge connected with the reference wave applied between two interconnected anodes and two interconnected cathodes and the remaining corners of the bridge connected in series with the integrated difference voltage.

15. Gyroscopic apparatus as claimed in claim 8 in which the integrating network comprises an integrator including at least a resistance-capacity network connected to the control grid of a valve with the capacity connected between the grid and anode of the valve.

16. Gyroscopic apparatus as claimed in claim 8 in which the integrating network comprises an inductance-resistance-capacity doubly integrating network.

17. Gyroscopic apparatus as claimed in claim 16 in which the network has a damping factor of approximately 0.6.

References Cited in the file of this patent

UNITED STATES PATENTS

| | | |
|---|---|---|
| 2,349,758 | Raspet | May 23, 1944 |
| 2,417,689 | Johnson | Mar. 18, 1947 |
| 2,465,311 | Lear | Mar. 22, 1949 |
| 2,562,690 | Becker | July 31, 1951 |
| 2,719,291 | Wing | Sept. 27, 1955 |
| 2,737,054 | Wendt | Mar. 6, 1956 |

FOREIGN PATENTS

| | | |
|---|---|---|
| 971,418 | France | July 19, 1950 |